United States Patent [19]

Roberts

[11] 3,787,210

[45] Jan. 22, 1974

[54] LASER RECORDING TECHNIQUE USING COMBUSTIBLE BLOW-OFF

[75] Inventor: Donald Lee Roberts, Cypress, Calif.

[73] Assignee: The National Cash Register Company, Dayton, Ohio

[22] Filed: Sept. 30, 1971

[21] Appl. No.: 185,026

[52] U.S. Cl. .............. 96/27 E, 117/36.1, 117/46 R, 117/138.8 F, 346/1, 346/135, 346/76

[51] Int. Cl. .............. G03c 5/04

[58] Field of Search ...... 117/36.1; 346/1, 135, 76 L; 96/27 E

[56] References Cited

UNITED STATES PATENTS

| | | | |
|---|---|---|---|
| 3,207,621 | 9/1965 | Newman et al. | 117/36.1 |
| 3,655,379 | 4/1972 | Gundlach | 96/27 |
| 3,592,644 | 7/1971 | Vrancken et al. | 117/36.1 |
| 3,351,948 | 11/1967 | Bonn | 346/76 |
| 3,665,483 | 5/1972 | Becker et al. | 346/1 |
| 3,570,380 | 3/1971 | Kamenstein | 346/76 L |
| 3,573,847 | 4/1971 | Sacerdoti | 346/76 L |
| 3,061,454 | 10/1962 | Graf et al. | 117/36.1 |
| 3,408,216 | 10/1968 | Mott et al. | 117/36.1 |

*Primary Examiner*—Murray Katz
*Attorney, Agent, or Firm*—J. T. Cavender; Lawrence P. Benjamin

[57] ABSTRACT

A recording technique using a laser beam for image recording on a film. In the preferred embodiment, the film comprises a transparent substrate coated with heat absorbing particles, dispersed in a self-oxidizing binder. Contrary to the present practice of directing the laser beam on the coating itself, the laser beam is directed through the substrate with its energy focused on the boundary interface between the substrate and coating. This causes the coating to be removed, as by blow-off or explosion, leaving a clear area on the substrate forming a positive image of the recorded material.

If a negative is desired, the removed material can be collected on a backing, such as Scotch Brand tape, preferably in contact with the coating to thus provide both a positive and a negative of the written information from one and the same operation.

In both instances the laser beam can be scanned or incrementally positioned and a modulating device can gait the laser beam to record machine or human readable characters.

6 Claims, 6 Drawing Figures

PATENTED JAN 22 1974

3,787,210

LASER RECORDING TECHNIQUE USING COMBUSTIBLE BLOW-OFF

BACKGROUND OF THE INVENTION

1. Field of the invention

In the field of laser recording on film (by "film" is meant the lamination of the coating material on a substrate) it has been the accepted standard to focus a laser beam on the coating and to record information by burning away the coating with a laser beam concentrated by a lens array. Various methods have been employed to improve the actual recording on the film to insure the contrast and clarity of characters and it is common in the industry to use some type of analog or digital control to position the laser beam. The beam is directed and focused on a coating of a dye or similar material on the substrate (generally Mylar or an equivalent). As the laser beam is focused directly on the dye, the dye is boiled, burned or otherwise removed, leaving a section which constitutes the character forming portion of the film. Continuous control of the beam will result in the further burning or removal of additional sections of dye, which ultimately will form a character capable of being read by human or machine read means.

One technique in which the laser beam is focused through the substrate, as contrasted to the conventional technique or applying the laser beam directly to the coating, is described in an article by M. L. Levene et al. which appears in Volume 9, No. 10, of *Applied Optics*, October 1970, pages 2,260–2,265. Within the article the authors describe various experiments best accomplished using a non-contacting surface and a higher powered laser. The authors use what they call a forward transfer through a gap using a typewriter ribbon comprised of a polyethylene substrate and a black coating, a gap of a specified distance, and an accepting substrate of either paper or Mylar. When a contacting accepting material is used (eliminating the gap) the transfer is by a heating and droplet transfer from the typewriter ribbon directly to the accepting material.

SUMMARY OF THE INVENTION

In this invention an organic, preferably flexible, substrate material, such as any one of the polycarbonates, polyesters, triesters and diesters, is coated with a material having heat absorbing characteristics, such as carbon black particles in a self-oxidizing binder, such as nitro-cellulose. To record on this lamination or film, a conventional laser beam is focused by a conventional lens system through the substrate to the boundary interface between the coating and the substrate. The power required at this focus point is sufficient only to heat the self-oxidizing binder to initiate combustion. This combustion, or blow-off, at this point carries with it the carbon black heat absorbing particles leaving clear positive (conventionally speaking) of the beam point. With conventional analog or digital techniques, the laser beam can be directed to write machine or human recognizable characters on the film. This technique, due to the combustion of the self-oxidizing binder, has the advantage of increased speed at reduced laser beam power over conventional laser recording. In a practical embodiment of this invention, the speed of recording was twice that of conventional laser recording and the laser power required was one-half, a fourfold improvement over the prior art techniques.

Another improvement this technique has over the prior art is the ability to provide a positive and negative image in one operation. This is accomplished by providing a particle collecting surface, such as conventional Scotch Brand tape, adjacent to or in contact with the coating as the case may be, so that the particles blown off by the laser beam are collected on the tape, and it has been found that after removing the tape from its adjacent contact with the coating, the negative can be used to produce other positives. The resolution of the negative is the same as the resolution of the original positive.

Accordingly, the principle object of this invention is the provision of a new and improved laser recording technique utilizing to advantage the combustible characteristics of a self-oxidizing binder in a coating to obtain higher resolution at increased speeds and at a reduced laser power requirement.

Still another object of the invention is to provide both a negative and a positive of the writing or printing produced by laser recording techniques in one operation.

Still another object of the invention is to provide a means for transferring the recorded material onto other media.

DESCRIPTION OF PREFERRED EMBODIMENT

Figures 1, 2, 3:
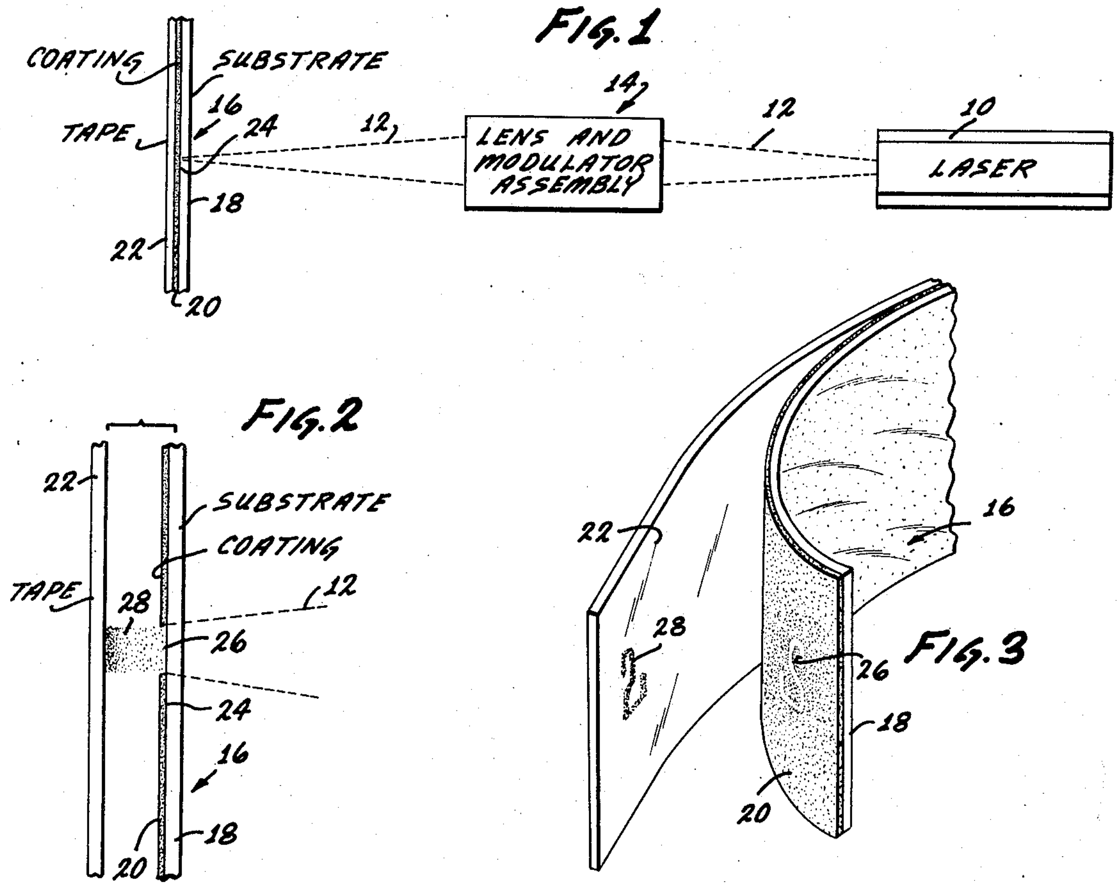
FIG. 1 is a schematic illustration of the laser recording system with a conventional laser beam focusing technique directed to the film.
FIG. 2 is a schematic illustration showing in a dramatic and exaggerated form an artist's conception in order to visualize the combustion of the coating used in the recording technique and showing the collecting material to form the positive and negative on one operation and utilizing the same system as that shown in FIG. 1.
FIG. 3 is an enlarged illustration of the formation of the negative and positive in one operation.
Figure 6:
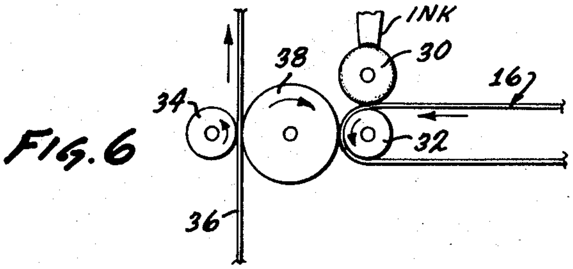
FIG. 6 is a schematic illustration of a manner in which to form other printouts on other media.

In the drawings a conventional source of laser energy 10 directs its beam 12 through a conventional lens system and modulating assembly indicated together as 14 toward the recording film 16.

Recording film 16 comprises a lamination of substrate of organic material chosen from a group consisting of polycarbonates, polyesters, triesters, and diesters in sheet material and a coating 20. Coating 20 comprises a material having heat absorbing characteristics such as carbon black particles dispersed in a self-oxidizing binder such as nitrocellulose.

As shown in FIGS. 1 and 2, if a negative is desired, the recording technique may be also provided with a backing material 22 to the film preferably in contact with the coating to form a means of collecting the removed coating.

As shown in the enlarged FIG. 2, the laser beam 12 is directed *through* the substrate 18 and its energy is focused at the boundary interface 24 between the substrate and the coating as contrasted to conventional techniques of laser recording on film where the coating faces the laser source.

Figure 4:
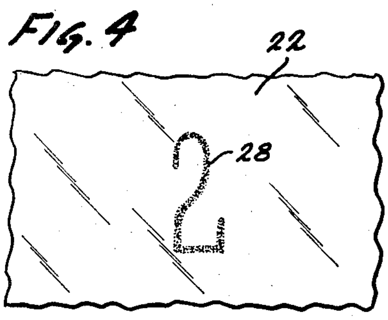
FIG. 4 is an illustration of a human recognizable character disclosed on the negative utilizing the recording technique of this invention and formed at the same time as the positive shown in FIG. 5.
Figure 5:
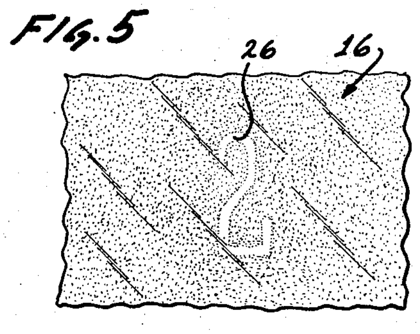

In this invention the focusing of the laser beam at the boundary interface 24 causes a removal of the coating material at the focus point leaving a clear spot as indicated at 26 and shown more clearly in FIGS. 3 and 5. Simple movement of the beam along the interface will enlarge or elongate the clear spot as desired. Thus, with suitable analog or digital techniques scanning or incrementally positioning the laser beam, machine or human recognizable characters can be written on the film as shown, for example, in FIGS. 3–5.

In a practical embodiment of this invention, the speed of recording was found to be twice the speed of conventional laser recording, and the laser power required was approximately one-half of the laser power normally required for conventional laser recording. This constitutes a fourfold improvement over the prior art techniques. One explanation for this success is that the heat of the focused laser beam is absorbed by the heat absorbing particles, initiating combustion of the self-oxidized binder. This combustion propels the material leaving the clear spot as shown in the artist's visual conception of the phenomena in FIG. 2. It is to be noted that the explosion or combustion phenomena is directed away from the source of energy and this is one explanation for the better performance of this invention as compared to conventional techniques where the energy of boiling or vaporization burning of dyes and coatings is directed back at the laser beam, opposing, as it were, the laser energy thus requiring more dwelling time for the laser beam to remove the material. This, of course, will reduce the speed of recording.

Another advantage of the present invention is higher resolution obtained and one possible explanation of this, too, is the fact that the removing of the material together with the self-energizing explosion in a direction away from the source of energy eliminates the opposition or conflict of energy caused by the boiling or vaporization of the film of conventional recording. The opposing energy phenomena does not permit a sharp focus of the laser energy where needed around the peripheral of the laser spot as it interfaces with the film.

Another possible explanation which has been proposed for the success of this invention is the fact that during the combustion of the binder material a chemical reaction may take place with the substrate material.

Another possibility for higher resolution and better writing when a coating (such as carbon black particles dispersed in nitrocellulose) is applied to the substrate, is that a chemical reaction occurs at the boundary of the coating and substrate, resulting in better adhesion thereon which creates a more rugged film and prevents flaking.

Turning again to FIG. 2, the artist's conception of the phenomena is illustrated by the carbon particles 28 being propelled against the backing 22 which can be held in contact with the coating or in such close proximity thereto so that there will be no loss in resolution by any dispersion of the material as it is being removed from the substrate during the recording. In the actual embodiment of this invention, this backing, comprised Scotch Brand tape, was pressed against the coating, and, after writing, the latter was peeled off revealing the formed negative, such as shown schematically in FIGS. 3 & 4.

While all the foregoing was described in connection with modulating the laser beam to form the recording, obviously it is within the scope of this invention to move the recording medium laterally holding the beam stationary or to move later, so long as the beam is focused at the interface to move; all that is required is simply relative movement between the beam and the film to form the recording.

It should also be clearly understood that while the use of the backing material 22 is part of the invention, it is only necessary if a negative is desired and that the basic recording technique of the invention can be practiced without the use thereof.

The positive, such as shown in FIG. 5, containing either machine or human readable characters, can be used to read directly as mentioned heretofore or to form other printouts on other media. To accomplish the latter, the characters are coated with a suitable printing ink and the printing is caused by pressing the inked character in contact with other media such as paper. For example, this is accomplished by rolling the positive past a source of printers ink such as roll 30 and through a roller 32 to sandwich and press the positive onto the transfer roller 38 which, in conjunction with pressure roller 34, prints onto the other media (paper, film or the like) 36. It has been found that the thickness of the coating (in actual embodiment a thickness in the range of 0.5 to 3 microns) is sufficient to accomplish the printing aforesaid.

What is claimed is:

1. A method of recording images using a film comprising a transparent substrate and a coating material located on one surface of said substrate, the coating consisting essentially of radiant energy heat absorbing particles in a self-oxidizing binder, the method comprising the steps of directing beamed laser energy through the transparent substrate and maintaining the laser energy at the boundary interface between the substrate and coating causing the coating to be removed imagewise.

2. The method of recording images as in claim 1 wherein said maintenance of the laser energy at the boundary interface initiates combustion of the binder blowing off the coating within the area affected by the laser energy.

3. The method as claimed in claim 1 comprising the additional step of collecting the removed coating onto a backing to form a second image recording contemporaneous with the first image recording.

4. A method of recording images using a film comprising a transparent substrate and a coating material located on one surface of said substrate, the coating material consisting essentially of radiant energy heat absorbing particles in a self-oxidizing binder, the method comprising the steps of: facing the substrate of the film toward a source of laser energy, focusing the laser energy at the boundary interface between the substrate and the coating thereby causing the coating to be removed imagewise at the focus point of the laser energy.

5. The method as claimed in claim 4 with the additional step of collecting the blow-off coating material on a backing material to form a negative.

6. The method of recording images as claimed in claim 4, comprising the additional step of inking the imaged coating on the film and pressing the film against another media to form additional recorded images.

* * * * *